(12) United States Patent
Sarnstrom et al.

(10) Patent No.: US 7,972,193 B2
(45) Date of Patent: Jul. 5, 2011

(54) NON-CONDUCTIVE BALLOONS AND METHODS OF PRODUCING SAME

(75) Inventors: Todd Sarnstrom, Ellsworth, WI (US); Paul Ansolabehere, Minnetonka, MN (US); Dean Borchardt, River Falls, WI (US); Andrew Swanson, Bayport, MN (US); Jeffrey J. Cernohous, Hudson, WI (US); Michael Fatica, North Kingstown, RI (US); Gianfranco Chicarella, North Providence, RI (US)

(73) Assignee: Anagram International, Inc., Eden Prairie, MN (US)

( * ) Notice: Subject to any disclaimer, the term of this patent is extended or adjusted under 35 U.S.C. 154(b) by 102 days.

(21) Appl. No.: 12/317,595

(22) Filed: Dec. 22, 2008

(65) Prior Publication Data
US 2010/0159795 A1   Jun. 24, 2010

(51) Int. Cl.
*A63H 3/06*   (2006.01)
(52) U.S. Cl. ........................................ 446/220; 446/226
(58) Field of Classification Search ........... 446/220–226
See application file for complete search history.

(56) References Cited

U.S. PATENT DOCUMENTS

| | | | |
|---|---|---|---|
| 4,077,588 A | 3/1978 | Hurst | |
| 4,290,763 A | 9/1981 | Hurst | |
| 4,501,798 A * | 2/1985 | Koschak et al. | 428/349 |
| 4,778,431 A | 10/1988 | Dudley | |
| 4,917,646 A | 4/1990 | Kieves | |
| 4,928,908 A | 5/1990 | Horii | |
| 5,108,339 A | 4/1992 | Kieves | |
| 5,209,972 A * | 5/1993 | Super et al. | 428/349 |
| 5,279,873 A * | 1/1994 | Oike | 428/35.4 |
| 5,338,243 A | 8/1994 | Kieves | |
| 2007/0287017 A1 * | 12/2007 | Sargeant et al. | 428/480 |
| 2009/0022919 A1 * | 1/2009 | Chicarella et al. | 428/35.9 |

FOREIGN PATENT DOCUMENTS

| | | |
|---|---|---|
| EP | 0792741 | 9/1997 |
| JP | 62-111734 | 5/1987 |

OTHER PUBLICATIONS

International Search Report for corresponding International App. No. PCT/US2009/067882, dated Apr. 23, 2010.

* cited by examiner

*Primary Examiner* — Nini Legesse
(74) *Attorney, Agent, or Firm* — McDonnell Boehnen Hulbert & Berghoff LLP

(57) ABSTRACT

The present invention relates to articles and methods for producing non-latex balloons with low surface electrical conductivities and an extended product life. In a preferred embodiment, a multilayer composite film having an exposed metallized layer is coated with an elastomeric sealant layer that increases electrical resistivity of the balloon product to greater than $1.0^8$ Ohms/sq. The invention relates to articles and methods for producing needed bonds and seal strength required to manufacture non latex balloons. The balloons of this invention have an extended product life because they are more resistant to common defects like pin holing and stress cracks than conventional balloon systems.

10 Claims, 1 Drawing Sheet

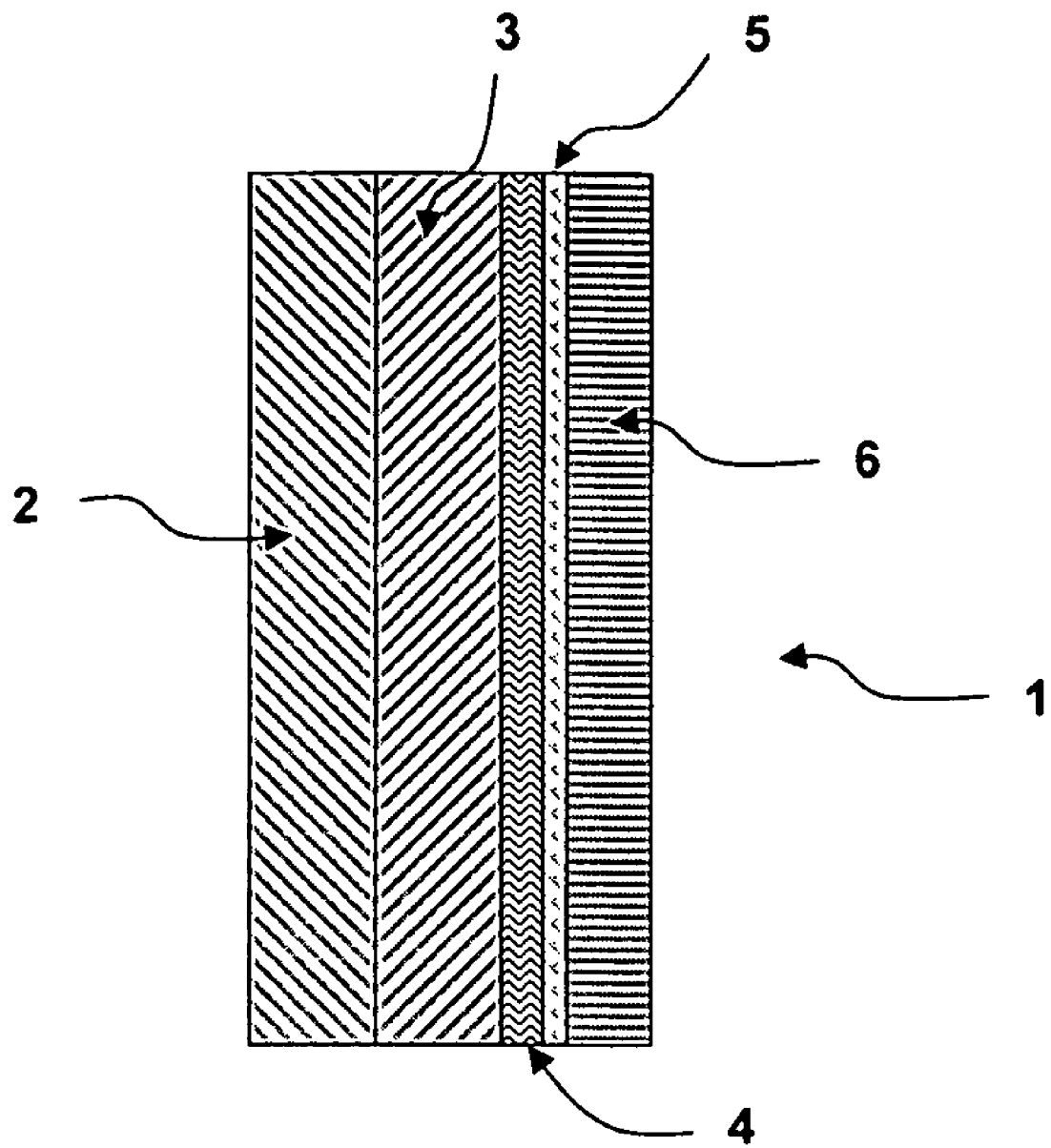
Fig.

NON-CONDUCTIVE BALLOONS AND METHODS OF PRODUCING SAME

SUMMARY OF THE INVENTION

The present invention relates to non-latex balloons having low electrical conductivity and to methods for producing such balloons, where at least one metalized layer is encapsulated with an elastomeric film layer. The low electrical conductivity is achieved by providing a balloon construction wherein a metalized layer is sandwiched between an elastomeric sealant layer and a film layer. Alternatively, our invention incorporates a primer that improves the adhesion between the elastomeric sealant and metalized layers. The balloons of these embodiments have low electrical conductivity, increased float life, improved scuff resistance and the needed bonds and seal strength required to manufacture non latex balloons.

For the purpose of this invention electrical conductivity is a measure of how well the surface of the balloon accommodates the movement of an electric charge. Electrical resistivity is the reciprocal of conductivity. It is the opposition to the flow of electrical current on the surface of a balloon. The unit of measure for electrical resistivity is the ohm. Materials with low resistivity are good conductors of electricity and materials with high resistivity are good insulators. In this inventions resistivity was tested as the indicator for conductivity.

BACKGROUND OF THE INVENTION

Non-latex balloons, often referred to as metalized balloons, have been popular for many years. See, e.g., U.S. Pat. Nos. 4,077,588; 4,290,763 and 4,917,646, the teachings of which are incorporated herein by reference. Typically one or more sheets of the non-latex balloon is printed with a colorful decoration, such as a character, design, message, or combination thereof. More recently, toy products have developed which include a combination of balloons or a combination of balloons and other structures, such as appendages. See, e.g., U.S. Pat. Nos. 5,338,243; 4,778,431 and 5,108,339, the teachings of which are also incorporated herein.

Films constructed of multiple layers are known in the art as a viable strategy to combine the characteristics of each film layer into an overall film construction. For example, it is well known in the art that metalizing polymeric films improves the barrier properties of that film towards water and gases such as carbon dioxide, oxygen and also lighter-than-air gas, such as helium. In the case of the latter, metalized polymeric films have found wide application for producing helium filled balloons. For example, metalized polyamides (e.g., Nylon 6) have been widely used in this application. However, the difference in mechanical properties between the Nylon layer and metalized layer can be problematic in this application. Upon inflation of a balloon, the Nylon layer stretches and can cause microscopic cracks in the metalized layer because the metalized layer does not have the same elastic properties as the Nylon. This unfortunately reduces the barrier properties of the film and subsequently the inflated life of the balloon. One strategy to alleviate this problem is to utilize a higher modulus, more stretch resistant polymeric film. Polyethylene terephthalate (PET) is an example. However, when a more stretch resistant film is utilized in a helium balloon construction this often results in greater instances in seam failure and film cracking because the force that was being dissipated by the film is now more highly concentrated at other areas of the balloon.

It is also known to construct buoyant helium balloons that comprise a sealant layer, a film layer and a metal barrier layer. Additionally, it is known in the art to use a primer to provide the desired level of adhesion between the seal and film layers that is required to produce a functional and robust balloon. The metal layer has been the focus of unsupported claims that buoyant metalized helium balloons have become entangled in power lines leading to nuisance power outages. The suspected cause of these incidents is attributed to the high electrical conductivity of the outer metal layer of these types of metalized balloons. To the extent such problems actually exist, our invention eliminates this concern by encapsulating the metal layer between insulating elastomeric polymer film layer such that the electrical conductivity of the finished balloon is reduced by at least 5 magnitudes ($10^5$).

BRIEF DESCRIPTION OF THE INVENTION

Our invention can be summarized as a non-latex balloon product comprising, in combination, a film, where a metalized layer is adhered to one side of the polymeric film. An elastomeric sealant layer is layered over the exposed side of the metalized layer such that the finished balloon product will have a surface electrical resistivity of greater than $1.0^{11}$ Ohms/sq. This defines the highly dissipative film as virtually non conductive. In some instances it is preferable to add a primer to the exposed side of the metalized layer prior to adhering the elastomeric sealant layer.

Our invention also covers a non-latex balloon product comprising, in combination, a polyethylene terephthalate (PET) film having first and second sides, an amorphous layer adhered to the first side of the core polyester layer, where a metalized layer is adhered to the second side of the core polyester layer or to the amorphous layer. An elastomeric sealant layer is applied to either a non-primer or primer coated exposed side of the metalized layer resulting in a balloon product that has a surface electrical resistivity of greater than $1.0^{11}$ Ohms/sq.

BRIEF DESCRIPTION OF THE DRAWING

FIG. 1 is schematic side view of one embodiment of the multi-layered film composite of the non-latex balloon product of our invention.

DETAILED DESCRIPTION THE OF INVENTION

As mentioned, multilayer films are known in the art as a viable strategy to combine the characteristics of each film layer into an overall film construction. For example, it is well known in the art that metalized polymeric films improves the barrier properties of that film towards water and gases such as carbon dioxide, oxygen and also helium. In the case of the latter, metalized polymeric films have found wide application for producing balloons that are filled with lighter than air gases, such as helium. However, the difference in mechanical properties between the polymer film layer and metalized layer can be problematic in this application. Upon inflation of a balloon, the film layer stretches and can cause microscopic cracks in the metalized layer because it does not have the same elastic properties. This reduces the barrier properties of the film and subsequently the inflated life of the balloon. Although the art has used a higher modulus, more stretch resistant polymeric film, this often results in greater instances in seam failure and film cracking because the forces that were being dissipated by the film are now more localized at seams and other stress areas of the balloon. Although the use of a multilayer polyester construction can provide outstanding resistance to cracking while providing an improved barrier to helium upon inflation, these constructions still have high electrical conductivity as a result of the metalized layer being on the exposed exterior of the balloon construction. Our invention coats or encapsulates the metal layer with the addition of an elastomeric polymer layer directly over the metalized layer. This elastomeric layer results in balloon constructions that have very low electrical conductivity. Compared to existing metalized balloons, conductivity reductions of up to 5 magnitudes ($10^5$) are achieved by incorporating an internal metalized layer. The balloons of our invention also offer exceptional metal integrity and outstanding bonds and seal strengths. Electrical conductivity of the balloon can be determined by measuring the surface and volume resistivity of the balloon, utilizing methods such as ASTM D257 or ANSI/ESD STM11.12-2007.

The balloon product of our invention comprises at least a base polymeric film layer, a metalized layer and an elastomeric sealant layer. As used in this application the term "elastomeric polyolefin" has a specific definition. Various definitions have been employed to define elastomers in the past. Generally, an elastomer is defined as a substance that has the properties of a rubber such that it stretches under tension, generally has a high tensile strength, retracts rapidly, and generally recovers its original dimensions upon being released after stretching. An elastomer will typically have plastic-type traits in processing and rubber-type traits in functionality. Such polyolefins, when formed into various substrates, will be extensible in at least one direction when a biasing force is applied, and will return to some portion of its original dimensions after the biasing force is removed. Elastomeric compositions, when formed into a meltblown web, will generally, but not always, have the capability of being stretched to an elongation of at least about 25% of its original relaxed length, and upon release of the stretching force will recover at least about 40% of the elongation, i.e., will, in the case of 25% elongation, contract to an elongation of not more than about 15%. (For example, a 4 inch length of material will be deemed to be an elastomer if it can be stretched to a length of at least about 5 inches and if, upon release of the stretching force, it contracts, in the case of being stretched to 5 inches, to a length of not more than about 4.6 inches.)

Elastomeric properties are a function of temperature and rate of elongation. For the purpose of the examples in FIG. 2, room temperature and normal balloon expansion rates were used. The elastomeric sealant layer used in our invention has a recovery of elongation preferably 40 to 100%, more preferably 60 to 100% and most preferably 75 to 100%.

FIG. 2.
Elastomeric Properties of Sealant Layer Conducted at Room Temperature

| Elastomeric Sealant Layer | Elongation % | Elongation Rate | Average Recovery of Elongation % |
|---|---|---|---|
| A | 25% | 1 inch/min | 82% |
| A | 25% | 5 inch/min | 85% |
| A | 25% | 10 inch/min | 87% |
| A | 25% | 15 inch/min | 90% |
| B | 25% | 1 inch/min | 86% |
| B | 25% | 5 inch/min | 87% |
| B | 25% | 10 inch/min | 89% |
| B | 25% | 15 inch/min | 91% |
| C | 25% | 1 inch/min | 85% |
| C | 25% | 5 inch/min | 85% |
| C | 25% | 10 inch/min | 86% |
| C | 25% | 15 inch/min | 86% |

Where:
"A" is a low density, linear low density polyethylene blend.
"B" is a low density, linear low density polyethylene and ethylene alpha olefin blend.
"C" is a 4% EVA copolymer resin, high impact, high clarity LDPE.

In contrast to the specific "elastomeric polyolefin" defined above for use in our invention, a "non-elastomer" or "non-elastomeric polyolefin" is defined for purposes of the present invention as being a polyolefin that when formed into a melt-blown web, will, but not always, fail to meet the stretch characteristics for an elastomeric web set forth above. Examples of non-elastomeric polymer films used in balloon manufacture are disclosed in U.S. Pat. No. 4,077,588, where it is suggested that such non-elastomeric polymer films polymers can be used to coat a metal film. As described in the examples below, using a non-elastomeric polyolefin as taught in the '588 patent to coat a metalized layer results in a balloon that has no ability to be inflated more than at or about one atmosphere of pressure with air or lighter than air gas. In contrast, our invention requires the use of an elastomeric polyolefin sealant applied to the metalized layer, preferably linear low density polyethylene, which results in a balloon that has the ability to be inflated greater than one atmosphere of pressure with air or lighter than air gas.

The overall thickness of the multilayer balloon film is preferably between 5 and 70 microns, more preferably between 5 and 50 microns and most preferably between 5 and 35 microns. In this multilayer construction, the base composite film layer thickness is preferably 30 to 95% of the overall thickness, more preferably 40 to 80% of the overall thickness and most preferably 50 to 75% of the overall layer thickness. The elastomeric sealant layer of this construction is preferably 5 to 75% of the overall thickness, more preferably 5 to 60% and most preferably 5 to 40% of the overall thickness. The metalized layer is preferably 0.0001 to 1% of the overall thickness, more preferably 0.001 to 0.1% and most preferably 0.005 to 0.05% of the overall thickness. This construction is subsequently thermally welded and die cut to form a balloon article.

FIG. 1 illustrates schematically the cross section of one embodiment of the multilayered film 1 that is used to manufacture the non-latex balloon products of the present invention. The base polymeric film layer of this invention can be produced from any thermoplastic material commonly utilized for helium balloon films. Non-limiting examples of thermoplastic materials useful for the base polymeric film layer of our invention include polyamides, polyesters and polyolefins. Preferably the base polymeric film layer comprises a polyethylene terephthalate (PET) layer 3 and a amorphous polyester layer 2. The amorphous polyester layer 2 is preferably co-extruded with the core layer 3 to increase the bonding between the core polyester layer 3 and the amorphous layer 2.

To this base polymeric film is added a metalized layer 4, for example, direct lamination of a thin metal foil or vapor deposition or sputtering. In a preferred method, the metalized layer is applied to the exposed polymeric layer in thicknesses measured by optical density. A preferred method is vacuum deposition, which is capable of applying a metal layer of about 1.8 to about 3.2 optical density. Adhesion between the metalized barrier layer 4 and the polymeric layer is also important factor because the damage or removal of the metalized layer 4 during the processes of balloon fabrication and un-expected handling at the end consumers would degrade the barrier property of the film no matter how the newly produced film showed good barrier property. Especially for this invention, because the metalized layer 4 needs to be buried in between the base composite film and the sealant layer 6, the metalized layer 4 needs to remain adhering to the base polymeric film with sufficient strength not to cause de-lamination in the structure. The dry bonding strength between the base polymeric film and the metalized layer 4 may be more than 300 g/in, preferably more than 600 g/in.

Especially when the metalized layer 4 would be exposed to the wet process, such as applying any water base primer on the metalized layer 4 to enhance the lamination and sealing strength of the laminate and balloon, the bonding strength at wet condition between the base polymeric film and the metalized layer 4 would be important. The bonding strength between the base polymeric film and the gas barrier layer 4 in wet conditions is preferably more than 30 g/in, more preferably more than 100 g/in, most preferably more than 600 g/in.

To achieve such bond strength values, an electrical treatment such as plasma/corona treatment on the polyester film would be used before the gas barrier layer is applied on the polyester film. To achieve higher bond strength value, additional deposition anchorage layer, such as Cu seeding, Ni seeding are preferably applied before the main metal barrier layer is deposited. Instead of or in addition to such deposition anchorage layer, amorphous layer 2 mentioned above and/or additional coating layer on the base composite film would be preferable.

The metalized layer 4, PET layer 3 and amorphous polyester layer 2 represent one of many preferred starting multi-layered films that are used to manufacture the balloon products of our invention.

In contrast to prior used balloon films, an elastomeric sealant layer 6 is added directly to the metalized layer 4, preferably using an extrusion coating process that is known to those skilled in the art of manufacturing multilayered balloon films. In a preferred embodiment, the metalized side of the film is first coated with an optional priming layer 5. The priming layer is utilized to improve interfacial adhesion between the elastomeric sealant layer and the exposed metalized layer. Many primers are known in the art for improving the adhesion between such materials and can be applied using conventional melt or solution coating techniques. In this instance, a preferred embodiment of this invention utilizes some grades of copolyethylenes, for example ethyleneacrylicacid (EAA), or polyethylenimine and its derivatives, as well as silane coupling agents. Silane coupling agent would be selected from a number of molecules containing two or more functional groups, one being the silane and another functional group having reactivity with the resin. The silane functional group can form covalent bonds to itself and to the oxide surface of polymers and minerals and the other functional group is selected to react with the resin. In the case of amino-silanes, the amino group can form a chemical bond with the oxidized sealant layer. A wide range of other functional groups are available that can react with the sealant resin through various chemistries of the sealant polymer. Combinations of various functional groups with the silane group are referred to as organosilanes and well known as coupling agents and primers in their use to increase adhesion between different materials. The amino functional group has the advantage that when one or more are combined with the silane functional group, the result is an amino-silane molecule that can easily be diluted and applied from water with unusually stable dilute aqueous mixtures which are free from rapid gel formation, preferably, such as amino aloxy silane, aminopropylsilane (APS), aminotriethoxysilane or combinations thereof. Preferred silanes useful in this invention include, but are not limited to: alkoxysilanes, functional alkoxysilanes, amino alkoxysilanes, alkyl alkoxysilanes and vinyl alkoxysilanes or combinations thereof.

The elastomeric sealant layer 6 of this invention is chosen such that it has adequate adhesion to itself when thermally welded and die cut to act as a robust balloon seam. The preferred elastomeric sealant layer 6 of this invention is a polyolefin having seal strength greater than 2000 g/in. More specifically, a preferred embodiment utilizes linear low density polyethylene (LLDPE) as a sealant layer having a seal strength greater than 3500 g/in allowing the balloon to be inflated greater than one atmosphere of pressure with air or lighter than air gas. The elastomeric sealant layer thickness is preferably between 5 and 50 microns, more preferably between 5 and 30 microns and most preferably between 5 and 25 microns. It has been found that extrusion coating of the sealant layer onto the metalized layer of this invention provides an excellent construction for balloon applications that is resistant to common defects (e.g., pinholes, cracking) seen in balloons known in the art. In a preferred embodiment, the bond strength between the sealant layer and the metalized layer is greater than 200 g/in, more preferably it is greater than 350 g/in and most preferably it is greater than 500 g/in. The sealant layer is applied in a quantity such that the electrical conductivity of the final multi layered film or finished balloon product is lower when compared to balloons having exterior metalized layers. Preferably, the surface electrical resistivity is greater than $1 \times 10^8$ Ohms/sq, more preferably greater than $1 \times 10^9$ Ohms/sq and most preferably greater than $1 \times 10^{10}$ Ohms/sq. This resistivity is in contrast to existing balloons with exterior metalized surfaces that have resistivity of less than $1 \times 10^3$ Ohms.

The elastomeric sealant material of this invention is chosen such that it is melt processable. Melt-processing typically is performed at a temperature from 120° to 330° C.; although optimum operating temperatures are selected depending upon the melting point, melt viscosity, and thermal stability of the sealant layer chosen. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 23-48, 1986.

Upon coating the metalized layer with the sealant layer, the film construction is registered before thermal die cutting and welding to the desired shape and size. Careful selection of the temperatures and pressures for the die cutting and welding processes are always important for providing a balloon with a robust seam. Mechanical heat seal and die cutting allows for more precise control of exerted pressures than hydraulic die cutting processes, because of the ease of adjusting the pressures exerted, mechanical heat seal and die cutting processes are preferred for the films of this invention. It has also been found that thick seam constructions (1/32" to 1/2") offer greater resistance to defects with the non-latex balloon film composite of this invention. Regardless of whether hydraulic or mechanical die cutting is used, it well known to use die cutting on multi-layered films to prepare appropriate balloon shapes. In practice, because of the flexibility of the polymeric film construction, the balloons shape may be any that is desired such as round, square, triangular, curved, and the like.

The shape may be that of famous novelty characters such as dinosaurs, the insignia of athletic teams and the like. After aligning the desired shapes of the film composite they are joined or adhered to each other, leaving an opening so that the material may be later inflated. Adhesion or joining of the cut shapes can be accomplished using means well known in the art. If desired, a valve can be inserted into the opening and the layers abutting the valve adhered to form a complete structure. The use of a valve is considered optional. For use as a balloon, the seamed film composite is inflated by inserting a lighter than air gas into the opening, sealing the opening after the material has been fully inflated or through a valve, if present. In practice, the materials of the present invention are capable of retaining the lighter-than-air gas, preferably helium for at least seven days, more preferably more than 14 days and most preferably more than one month and one year being possible. As a result, the resulting materials are considered excellent candidates for premium quality balloons.

Test Methods

Dry bonding strength of the metalized layer to the polymeric film substrate was measured by heat-sealing of an Dow PRIMACOR 3300 film to the metal surface on a Sentinel heat sealer. On the back side of the film, adhesive tape (3M 610) is applied to keep the film from breaking during the test. Heat seal conditions are 220 degree F. temperature, 20 seconds dwell time, and 40 psi jaw pressure, 1 heated jaw. Prior to peeling the sealed materials are cut so that each web can be gripped in a separate jaw of the tensile tester and one square inch section of sealed material can be peeled. The peel is initiated by hand and then the two webs are peeled apart on an Instron tensile tester in a 180 degree configuration toward the PRIMACOR film. If the metal is separated from the substrate and remains attached to the PRIMACOR film then the mean force of the peel is reported as the metal bond strength.

Wet bonding strength of the metalized layer was measured by the same procedure as dry bonding strength, with the exception that a cotton swab soaked with water is used to apply water to the interface of the sealed area as it is being peeled.

Sealing strength of the elastomeric coating was measured per the following: The seal layer is sealed to itself using a Pack Rite heat sealer with 15"×⅜" jaw. The heat seal conditions are 405 degrees F. temperature, 2 seconds dwell time, and 90 psi jaw pressure, 1 heated jaw. Prior to peeling the sealed materials are cut such that each web can be gripped in a separate jaw of the tensile tester and the sealed material can be peeled. The two webs are peeled apart on an Instron tensile tester in an unsupported 90° configuration known as a T-peel. A peel speed of 6"/minute with a jaw separation of 4" is used until the load drops by 20%, signaling failure. The maximum recorded load prior to failure is reported as the seal strength.

The bond strength of the elastomeric coating to the metalized surface requires the use of a separate sheet dropped onto the film web before the extrudate application during the extrusion process. The sheet subsequently shields the film under the sheet from extrusion coating and thus provides a means of separating the extrudate from the extruded film. The interfacial bond strength between the extrudate and the film is measured during an unsupported 90° peel test of the test sample. The test samples are configured such that the unsupported portion of the test sample is the extruded film and the peel portions of the test sample are the uncoated film and the extruded sheet. A peel speed of 6"/minute with a jaw separation of 1¼" is used and the maximum recorded load during a ½" distance is reported as the bond strength.

Surface resistivity of the film was measured using an ACL Staticide Model 800 Megohmmeter with concentric ring electrodes, following the ANSI/ESD STM11.11-2006 test method.

Floating time of the balloon is determined by inflating it with helium gas and measuring the number of days that the balloon remains fully inflated. A balloon is filled from a helium source using a pressure regulated nozzle designed for "foil" balloons, such as the Conwin Precision Plus balloon inflation regulator and nozzle. The pressure should be regulated to 16 inches of water column pressure with an auto shut off. The balloon should be filled with helium in ambient conditions of about 70 degrees F. temperature until the internal pressure of the balloon reaches 16 inches of water column and the regulator shuts off. The balloon should be tethered below the balloon's valve access hole to avoid distorting or damaging the valve thus creating slow leaks of helium gas through the valve. During the testing the balloon should be kept in stable environment close the ambient conditions stated. Changes in temperature and barometric pressure should be recorded to interpret float time results, as any major fluctuations can invalidate the test. The balloon is observed over the course of the test for the appearance of fullness. One judgment criteria used is when the appearance of the balloon changes so that the wrinkles running through the heat seal seam area become deeper and longer, extending into the front face of the balloon; and the cross-section of seam becomes a v-shape, as opposed to the rounded shape that characterizes a fully inflated balloon. At this time the balloon will still physically float, but will no longer have an aesthetically pleasing appearance. The number of days between initial inflation and the loss of aesthetic appearance described above is reported as the floating time of the balloon.

EXAMPLES

Several tests were performed to evaluate balloons made using the methods and films of this invention. The first test involved a side by side experiment comparing control balloon products to balloon products made with the film of this invention. The following balloon compositions were tested:

1) Control—a film comprising a metalized layer/a PET layer/an amorphous PET layer/a primer layer/an extrusion coated sealant layer
2) Hurst '588 patent—a film comprising a non-elastomeric sealant layer/a metalized layer/non-elastomeric polyester layer (col. 6, lines 34-45).
3) Present Invention—a film comprising a PET layer/an amorphous PET layer/a metalized layer/an extrusion coated elastomeric sealant layer.
4) Present Invention—a film comprising a PET layer/an amorphous PET layer/a metalized layer/a primer layer/an extrusion coated elastomeric sealant layer.
5) Present Invention—a film comprising an amorphous PET layer/a PET layer/a metalized layer/an extrusion coated elastomeric sealant layer.
6) Present Invention—a film comprising an amorphous PET layer/a PET layer/metalized layer/a primer layer/an extrusion coated elastomeric sealant layer.

These films were then mechanically die cut to form multiple balloon products of a standard size and shape. Multiple balloons of each example were filled with the same amount of helium and were buoyancy tested side by side at the same ambient conditions by tethering the balloons to a fixed support. Each of the balloons was measured for surface and volume electrical conductivity. The results are presented in the table below.

| Example | Sample | Surface Resistivity, ohms/sq | Metal Bond to Film (g/in) | Elastomeric Coating Bond to Metal (g/in) | Seal Strength (g/in) |
|---|---|---|---|---|---|
| #1 - Control | 1 | <1000 | n/a | 505 | 4627 |
| a film comprising a metalized layer/a PET | 2 | <1000 | n/a | 525 | 3981 |
| layer/an amorphous PET layer/a primer | 3 | <1000 | n/a | 514 | 4258 |
| layer/an extrusion coated elastomeric sealant | Average | <1000 | n/a | 514.67 | 4288.67 |
| layer | Std Dev | n/a | n/a | 10.02 | 324.09 |
| #2 - Hurst '588 patent | 1 | 4.97E+11 | 98 | 35 | 982 |
| a film comprising a non-elastomeric sealant | 2 | 2.39E+11 | 124 | 61 | 1024 |
| layer/a metalized layer/non-elastomeric | 3 | 2.49E+11 | 109 | 28 | 857 |
| polyester layer (col. 6, lines 34-45). | Average | 3.28E+11 | 110.33 | 41.33 | 954.33 |
|  | Std Dev | 1.46E+11 | 13.05 | 17.39 | 86.87 |
| #3 - Present Invention | 1 | 2.42E+11 | 865 | 507 | 4522 |
| a film comprising a PET layer/an amorphous | 2 | 3.32E+11 | 752 | 585 | 4411 |
| PET layer/a metalized layer/an extrusion | 3 | 2.78E+11 | 816 | 467 | 4115 |
| coated elastomeric sealant layer | Average | 2.84E+11 | 811.00 | 519.67 | 4349.33 |
|  | Std Dev | 4.53E+10 | 56.67 | 60.01 | 210.39 |
| #4 - 3 Present Invention Preferred Embodiment | 1 | 2.84E+11 | 947 | 532 | 3762 |
| a film comprising a PET layer/an amourphous | 2 | 3.18E+11 | 883 | 535 | 4404 |
| PET layer/a metalized layer/a primer layer/an | 3 | 2.84E+11 | 865 | 572 | 4141 |
| extrusion coated elastomeric sealant layer | Average | 2.95E+11 | 898.33 | 546.33 | 4407.00 |
|  | Std Dev | 1.96E+10 | 43.10 | 22.28 | 322.74 |
| #5 - Present Invention | 1 | 1.36E+11 | 839 | 547 | 4235 |
| a film comprising an amorphous PET layer/a | 2 | 1.33E+11 | 795 | 575 | 4632 |
| PET layer/a metalized layer/an extrusion coated | 3 | 1.44E+11 | 826 | 549 | 4168 |
| elastomeric sealant layer | Average | 1.38E+11 | 820.00 | 557.00 | 4345.00 |
|  | Std Dev | 5.69E+09 | 22.61 | 15.62 | 250.80 |
| #6 - Present Invention Preferred Embodiment | 1 | 1.35E+11 | 992 | 555 | 4084 |
| a film comprising an amorphous PET layer/a | 2 | 1.41E+11 | 894 | 559 | 3899 |
| PET layer/metalized layer/a primer layer/an | 3 | 1.44E+11 | 965 | 564 | 4149 |
| extrusion coated elastomeric sealant layer | Average | 1.40E+11 | 950.33 | 559.33 | 4360.00 |
|  | Std Dev | 4.58E+09 | 50.62 | 4.51 | 129.71 |

This represents a decrease of 8 magnitudes ($10^8$) in electrical conductivity for the balloons made according to our invention.

The balloons were also monitored each day for the appearance of fullness, which is a direct indication of loss of helium. The float life for the control balloons averaged 12 days, whereas the balloons made following the Hurst '588 patent were unable to be inflated above atmospheric pressure or failed within 2 hours. Float life for balloons made according to our invention averaged 24 days; thus representing a 2 fold increase in the life of the balloon.

From the above disclosure of the general principles of the present invention and the various embodiments described, those skilled in this art will readily comprehend the various modifications to which the present invention is susceptible. Such changes and modifications may be made to the invention without departing from the true scope and spirit of the invention. Therefore, the scope of the invention should be limited only by the following claims and equivalents thereof.

We claim:

1. A non-latex balloon product comprising, in combination:
   a. a core polyester layer having first and second sides;
   b. an amorphous polyester layer adhered to the first side of the core polyester layer;
   c. a metalized layer adhered to the second side of the core polyester layer where the metalized layer has an exposed side; and
   d. a elastomeric sealant layer comprising a melt processable polyolefin overlaying the exposed side of the metalized layer, where the elastomeric sealant layer has bond strength to the metalized layer that is greater than 200 g/in,
   wherein the balloon product has a surface electrical resistivity of greater than $1.0^8$ Ohms/sq.

2. A non-latex balloon product comprising, in combination:
   a. a core polyester layer having first and second sides;
   b. an amorphous polyester layer adhered to the first side of the core polyester layer;
   c. a metalized layer overlaying on the amorphous polyester layer where the metalized layer has an exposed side; and
   d. an elastomeric sealant layer comprising a melt processable polyolefin overlaying the exposed side of the metalized layer, where the elastomeric sealant layer has bond strength to the metalized layer that is greater than 200 g/in;
   wherein the balloon product has a surface electrical resistivity of greater than $1.0^8$ Ohms/sq.

3. The balloon product of claims 1 or 2 wherein the layers have a measurable thickness and the elastomeric sealant layer is 5 to 75% of the thickness.

4. The balloon product of claims 1 or 2 wherein the elastomeric sealant layer comprises linear low density polyethylene (LLDPE).

5. The balloon product of claims 1 or 2 further characterized in that it can be inflated to greater than one atmosphere of pressure with air or lighter than air gas.

6. The balloon product of claims 1 or 2 wherein the elastomeric sealant layer has a thickness in the range from about 5 to about 50 microns.

7. The balloon product of claims 1 or 2 wherein the elastomeric sealant layer has a seal strength to itself that is greater than 2000 g/in.

8. The balloon product of claims 1 or 2 wherein the elastomeric sealant layer has a recovery of elongation preferably 40 to 100%.

9. The balloon product of claim 2 characterized in that the core polyester layer comprises polyethylene terephthalate (PET).

10. The balloon product of claim 2 wherein the amorphous polyester layer and the metalized layer has a dry bonding strength greater than 300 g/in.

* * * * *

UNITED STATES PATENT AND TRADEMARK OFFICE
CERTIFICATE OF CORRECTION

PATENT NO. : 7,972,193 B2
APPLICATION NO. : 12/317595
DATED : July 5, 2011
INVENTOR(S) : Todd Sarnstrom et al.

It is certified that error appears in the above-identified patent and that said Letters Patent is hereby corrected as shown below:

On the Title Page Item (57) in the Abstract, please delete "1.08" and replace with $-- 1 \times 10^8 --$ At col. 2, line 22, please delete "1.011" and replace with $-- 1 \times 10^{11} --$ At col. 2, line 36, please delete "1.011" and replace with $-- 1 \times 10^{11} --$

Please replace the table at col. 9, lines 1-32, with the following table:

| Example | Sample | Surface Resistivity, Ωohms/sq | Metal Bond to Film (g/in) | Elastomeric Coating Bond to Metal (g/in) | Seal Strength (g/in) |
|---|---|---|---|---|---|
| #1 - Control<br>a film comprising a metalized layer/a PET layer/an amorphous PET layer/a primer layer/an extrusion coated elastomeric sealant layer | 1 | <1000 | n/a | 505 | 4627 |
|  | 2 | <1000 | n/a | 525 | 3981 |
|  | 3 | <1000 | n/a | 514 | 4258 |
|  | Average | <1000 | n/a | 514.67 | 4288.67 |
|  | Std Dev | n/a | n/a | 10.02 | 324.09 |
| #2 - Hurst '568 patent<br>a film comprising a non-elastomeric sealant layer/ a metalized layer/ non-elastomeric polyester layer (col. 6, lines 34-45) | 1 | $4.97 \times 10^{11}$ | 98 | 35 | 982 |
|  | 2 | $2.39 \times 10^{11}$ | 124 | 61 | 1024 |
|  | 3 | $2.49 \times 10^{11}$ | 109 | 28 | 857 |
|  | Average | $3.28 \times 10^{11}$ | 110.33 | 41.33 | 954.33 |
|  | Std Dev | $1.46 \times 10^{11}$ | 13.05 | 17.39 | 86.87 |
| #3 - Present Invention<br>a film comprising a PET layer/an amorphous PET layer/ a metalized layer/an extrusion coated elastomeric sealant layer | 1 | $2.42 \times 10^{11}$ | 865 | 507 | 4522 |
|  | 2 | $3.32 \times 10^{11}$ | 752 | 585 | 4411 |
|  | 3 | $2.78 \times 10^{11}$ | 916 | 467 | 4115 |
|  | Average | $2.84 \times 10^{11}$ | 811.00 | 519.67 | 4349.33 |
|  | Std Dev | $4.53 \times 10^{10}$ | 56.67 | 60.01 | 210.39 |
| #4 - Present Invention Preferred Embodiment<br>a film comprising a PET layer/ an amorphous PET layer /a metalized layer/a primer layer/an extrusion coated elastomeric sealant layer | 1 | $2.84 \times 10^{11}$ | 947 | 532 | 3762 |
|  | 2 | $3.18 \times 10^{11}$ | 883 | 535 | 4404 |
|  | 3 | $2.84 \times 10^{11}$ | 865 | 572 | 4141 |
|  | Average | $2.95 \times 10^{11}$ | 898.33 | 546.33 | 4407.00 |
|  | Std Dev | $1.96 \times 10^{10}$ | 43.10 | 22.28 | 322.74 |
| #5 - Present Invention<br>a film comprising an amorphous PET layer/ a PET layer/a metalized layer/an extrusion coated elastomeric sealant layer | 1 | $1.36 \times 10^{11}$ | 839 | 547 | 4235 |
|  | 2 | $1.33 \times 10^{11}$ | 795 | 575 | 4632 |
|  | 3 | $1.44 \times 10^{11}$ | 826 | 549 | 4168 |
|  | Average | $1.38 \times 10^{11}$ | 820.00 | 557.00 | 4345.00 |
|  | Std Dev | $5.69 \times 10^{9}$ | 22.61 | 15.62 | 250.80 |
| #6 - Present Invention Preferred Embodiment<br>a film comprising an amorphous PET layer/a PET layer / metalized layer/a primer layer/an extrusion coated elastomeric sealant layer | 1 | $1.35 \times 10^{11}$ | 992 | 555 | 4084 |
|  | 2 | $1.41 \times 10^{11}$ | 894 | 559 | 3899 |
|  | 3 | $1.44 \times 10^{11}$ | 965 | 564 | 4149 |
|  | Average | $1.40 \times 10^{11}$ | 950.33 | 559.33 | 4360.00 |
|  | Std Dev | $4.58 \times 10^{9}$ | 50.62 | 4.51 | 129.71 |

Signed and Sealed this
Twenty-eighth Day of February, 2012

David J. Kappos
*Director of the United States Patent and Trademark Office*

CERTIFICATE OF CORRECTION (continued)
U.S. Pat. No. 7,972,193 B2

In the claims, claim 1, col. 10, line 39, please delete "1.08" and replace with $-- 1 \times 10^8 --$ In the claims, claim 2, col. 10, line 52, please delete "1.08" and replace with $-- 1 \times 10^8 --$